United States Patent
Wang et al.

(10) Patent No.: US 10,251,198 B2
(45) Date of Patent: Apr. 2, 2019

(54) CLEAR CHANNEL ASSESSMENT THRESHOLD CONFIGURATION

(71) Applicant: Telefonaktiebolaget LM Ericsson (publ), Stockholm (SE)

(72) Inventors: Yu Wang, Solna (SE); Anders Furuskär, Stockholm (SE); Filip Mestanov, Sollentuna (SE); Johan Söder, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 98 days.

(21) Appl. No.: 15/318,722

(22) PCT Filed: Jun. 26, 2014

(86) PCT No.: PCT/SE2014/050799
§ 371 (c)(1),
(2) Date: Dec. 14, 2016

(87) PCT Pub. No.: WO2015/199593
PCT Pub. Date: Dec. 30, 2015

(65) Prior Publication Data
US 2017/0127449 A1    May 4, 2017

(51) Int. Cl.
*H04W 74/08* (2009.01)
*H04B 17/318* (2015.01)
(Continued)

(52) U.S. Cl.
CPC ...... *H04W 74/0816* (2013.01); *H04B 17/318* (2015.01); *H04W 84/12* (2013.01); *H04W 88/08* (2013.01)

(58) Field of Classification Search
CPC ............ H04B 17/318; H04W 74/0816; H04W 88/08; H04W 84/12; H04W 74/08;
(Continued)

(56) References Cited

U.S. PATENT DOCUMENTS 7,623,494 B2    11/2009 Zhu et al.
7,830,848 B2    11/2010 Mhatre et al.
(Continued)

FOREIGN PATENT DOCUMENTS

JP    4406650 B2    2/2010
WO    2007027442 A2    3/2007

OTHER PUBLICATIONS

International Search Report and Written Opinion dated Mar. 19, 2015 in International application No. PCT/SE2014/050799, 12 pages.
(Continued)

*Primary Examiner* — Jamal Javaid
*Assistant Examiner* — Rosene Clark
(74) *Attorney, Agent, or Firm* — Rothwell, Figg, Ernst & Manbeck, p.c.

(57) ABSTRACT

A method is disclosed of an access point adapted to operate in association with a communication standard with application of a sense-before-transmit principle (a.k.a. a listen-before-talk principle, e.g. CSMA/CA) and adapted to communicate with one or more wireless communication devices associated with the access point. The method comprises (for each of the one or more wireless communication devices) maintaining (a respective clear channel assessment threshold value for the wireless communication device based on one or more parameters of the wireless communication device, wherein the respective clear channel assessment threshold value is for application in channel sensing related to an intended transmission to the wireless communication device. Corresponding computer program product, arrangement, physical layer convergence protocol (PLCP) sublayer, and wireless communication device are also disclosed.

20 Claims, 4 Drawing Sheets

(51) Int. Cl.
   *H04W 88/08* (2009.01)
   *H04W 84/12* (2009.01)

(58) Field of Classification Search
   CPC ... H04W 72/085; H04W 28/18; H04W 88/02; H04W 74/0808; H04W 52/243; H04W 72/082; H04W 74/006; H04L 1/0021; H04L 1/1867; H04L 43/16
   See application file for complete search history.

(56) References Cited

U.S. PATENT DOCUMENTS

| | | | |
|---|---|---|---|
| 2002/0188723 | A1 | 12/2002 | Choi et al. |
| 2005/0152313 | A1 | 7/2005 | Cave et al. |
| 2006/0046739 | A1 | 3/2006 | Blosco et al. |
| 2006/0092889 | A1* | 5/2006 | Lyons .................. H04W 16/08 370/338 |
| 2007/0060155 | A1 | 3/2007 | Kahana et al. |
| 2007/0072638 | A1 | 3/2007 | Yang et al. |
| 2007/0286122 | A1 | 12/2007 | Fonseca |
| 2008/0008133 | A1 | 1/2008 | Zhu et al. |
| 2008/0165727 | A1 | 7/2008 | Xiaoben et al. |
| 2009/0086843 | A1 | 4/2009 | Li |
| 2010/0067473 | A1 | 3/2010 | Cave et al. |
| 2013/0012134 | A1* | 1/2013 | Jin ....................... H04B 7/0845 455/62 |
| 2013/0017794 | A1 | 1/2013 | Kloper et al. |
| 2014/0362840 | A1* | 12/2014 | Wong ................... H04W 88/06 370/338 |
| 2014/0376453 | A1* | 12/2014 | Smith .............. H04W 74/0816 370/328 |
| 2015/0032868 | A1* | 1/2015 | Sung .................... H04L 1/0021 709/221 |
| 2015/0319700 | A1* | 11/2015 | Oteri .................... H04W 52/28 455/127.1 |
| 2016/0050674 | A1* | 2/2016 | Kenney ................ H04W 84/12 370/329 |

OTHER PUBLICATIONS

Li, G., et al., "Spectrum-Sensing Based Interference Mitigation for WLAN Devices", Communication Systems Software and Middleware and Workshops, 2008, COMSWARE 2008, 3rd International Conference on, Jan. 6, 2008, 7 pages.

Ma, H., et al, "Optimizing 802.11 Wireless Mesh Networks Based on Physical Carrier Sensing", IEEE/ACM Transactions on Networking, vol. 17, No. 5, Oct. 2009, Oct. 1, 2009, pp. 1550-1563.

Supplementary European Search Report dated Jun. 6, 2017 in European Application No. 14895520.6, 4 pages.

* cited by examiner

CLEAR CHANNEL ASSESSMENT THRESHOLD CONFIGURATION

CROSS-REFERENCE TO RELATED APPLICATION(S)

This application is a 35 U.S.C. § 371 National Phase Entry Application from PCT/SE2014/050799, filed Jun. 26, 2014, and designating the United States.

TECHNICAL FIELD

The present invention relates generally to the field of wireless communication with application of a listen-before-talk method (e.g. carrier sensing multiple access with collision avoidance—CSMA/CA). More particularly, it relates to configuration of a clear channel assessment threshold to be applied in such algorithms.

BACKGROUND

Wireless local area network (WLAN, also referred to as WiFi) is standardized in the IEEE 802.11 standards (see e.g. IEEE Standard for Information technology—Telecommunications and information exchange between systems; Local and metropolitan area networks—Specific requirements; Part 11: Wireless LAN Medium Access Control (MAC) and Physical Layer (PHY) Specifications).

The IEEE 802.11 specifications regulate the STA physical layer, MAC layer and other aspects (where STA, a WLAN entity, is taken to refer to an access point—AP—and/or to a wireless terminal, also referred to as a wireless communication device or simply a device) to secure compatibility and inter-operability between the access points and devices.

WLAN is typically operated in unlicensed bands. Thus, communication over WLAN may be subject to interference sources from any number of entities (known and/or unknown).

To deal with the interference, the WLAN technology relies on Carrier Sensing Multiple Access with Collision Avoidance (CSMA/CA). Application of CSMA/CA enables sharing, effectively and fairly, of the wireless medium among different WLAN entities and possibly even among different radio access technologies (RAT).

Application of CSMA/CA in WLAN requires that every entity that intends to send data first senses the common communication channel before carrying out a data transmission. If the channel is sensed as being free, the data transmission may be carried out as planned, while the data transmission is deferred or canceled if the channel is sensed to be busy. This approach avoids (or at least decreases) the occurrence of duplicate transmissions (i.e. collisions, often resulting in loss of data and need for retransmissions).

A WLAN entity (e.g. an access point) has a Clear Channel Assessment Threshold (CCAT, also referred to as the sensitivity threshold), which a received signal strength is compared to during the sensing process to determining whether the channel is busy or free. Typically, it is determined that the channel is busy if the received signal strength is larger than the threshold and it is determined that the channel is free otherwise.

FIG. 1 illustrates an access point (AP) 100 having four different associated devices 101, 102, 103, 104. The CCAT of the access point 100 is illustrated in terms of a sensing area 110. A signal received at the access point 100 and transmitted from a device within the sensing area 110 at a certain transmission power is typically larger than the CCAT. Hence, if any device 101, 102, 103, 104 within the sensing area 110 is transmitting, the channel is typically determined to be busy.

Configuration of the CCAT for an access point is a tradeoff between interference avoidance and channel utilization. A low CCAT value will enlarge the sensing area, thereby avoiding concurrent transmission with other WLAN entities located in a large vicinity, which typically reduces interference as experienced by devices associated with the access point and as experienced by neighboring access points and their associated devices. However, a low CCAT also reduces the possibilities for reusing the radio channel. On the other hand, a high CCAT value will result in a smaller sensing area, thereby enabling a larger extent of radio channel reuse while increasing the probability of collision. Thus, disadvantages will typically be experienced regardless of the CCAT value.

Therefore, there is a need for improved ways to configure the clear channel assessment threshold (CCAT).

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It should also be noted that even though carrier sensing multiple access with collision avoidance (CSMA/CA) is used herein as an illustrative example of a listen-before-talk method, the various embodiments may be equally applicable to any wireless communication with application of a listen-before-talk (or, equivalently, sense-before-transmit) principle. Furthermore, the use of the notation clear channel assessment threshold is meant to comprise (and not exclude) any threshold with the same purpose but potentially different naming in any wireless communication with application of a listen-before-talk principle.

It is an object of some embodiments to obviate at least some of the above disadvantages and to provide improved methods and arrangements for configuration of the clear channel assessment threshold (CCAT).

According to a first aspect, this is achieved by a method of an access point adapted to operate in association with a communication standard with application of a sense-before-transmit principle and adapted to communicate with one or more wireless communication devices associated with the access point.

The method comprises (for each of the one or more wireless communication devices) maintaining a respective clear channel assessment threshold value for the wireless communication device based on one or more parameters of the wireless communication device (thus, maintaining a respective clear channel assessment threshold value for each of the wireless communication device based on one or more parameters of each wireless communication device), wherein the respective clear channel assessment threshold value is for application in channel sensing related to an intended transmission to the wireless communication device.

The one or more parameters of the wireless communication device may, for example, comprise one or more of:
 a received signal strength (or power or similar) of a signal transmitted from the access point as received by the wireless communication device;

a received signal strength (or power or similar) of a signal transmitted from the wireless communication device as received by the access point;

an indication of a geographical location of the wireless communication device;

an indication of a geographical location of an interferer;

a target throughput to the wireless communication device; and a quality (e.g. bit error rate, packet error rate, or similar) of a communication link between the access point and the wireless communication device.

A geographical location may be defined as a geographical point (e.g. having specific geographical coordinates) and/or as a geographical area (including an ensemble of geographical points). Geographical coordinates may, for example, comprise a distance to the access point from the wireless communication device (or interferer) and/or an angle at which the access point sees the wireless communication device (or interferer).

In some embodiments, the respective clear channel assessment threshold value is determined as a maximum of:

a lowest possible threshold value; and a received signal strength minus a margin value.

The margin value may, according to some embodiments, be set to a first value if an interferer is indicated to be in a first geographical location and to a second value if the interferer is indicated to be in a second geographical location, wherein the first value is larger than the second value and the first geographical location is closer to a geographical location of the wireless communication device than the second geographical location is.

In some embodiments, the respective clear channel assessment threshold value may be increased if a measured throughput is higher than a target throughput and the respective clear channel assessment threshold value may be decreased if the measured throughput is lower than the target throughput.

The maintaining of the respective clear channel assessment threshold value may comprise initializing the respective clear channel assessment threshold value to a default value when the wireless communicating device is associated with the access point according to some embodiments.

In some embodiments, the maintaining of the respective clear channel assessment threshold value may comprise receiving a parameter report indicative of at least one of the one or more parameters from the wireless communication device, and updating the respective clear channel assessment threshold value based on the received parameter report.

In some embodiments, the maintaining of the respective clear channel assessment threshold value may further comprise transmitting a parameter request to the wireless communication device to trigger the parameter report.

In some embodiments, the maintaining of the respective clear channel assessment threshold value may comprise storing the respective clear channel assessment threshold value in a threshold database.

The method may, according to some embodiments, further comprise detecting that a transmission to the wireless communication device is intended, and sensing the channel based on the maintained respective clear channel assessment threshold value.

The sensing of the channel based on the maintained respective clear channel assessment threshold value may, in some embodiments, comprise comparing a received signal level to the maintained respective clear channel assessment threshold value, and determining the channel to be free for transmission to the wireless communication device if the received signal level does not exceed the maintained respective clear channel assessment threshold value.

A second aspect is a computer program product comprising a computer readable medium, having thereon a computer program comprising program instructions. The computer program is loadable into a data-processing unit and adapted to cause execution of the method according to the first aspect when the computer program is run by the data-processing unit.

According to a third aspect, an arrangement is provided for an access point adapted to operate in association with a communication standard with application of a sense-before-transmit principle and adapted to communicate with one or more wireless communication devices associated with the access point.

The arrangement comprises means for maintaining (for each of the one or more wireless communication devices) a respective clear channel assessment threshold value for the wireless communication device based on one or more parameters of the wireless communication device, wherein the respective clear channel assessment threshold value is for application in channel sensing related to an intended transmission to the wireless communication device.

The means for maintaining a respective clear channel assessment threshold for each of the one or more wireless communication devices may, in some embodiments, comprise a threshold database adapted to store the respective clear channel assessment threshold value.

In some embodiments, the means for maintaining a respective clear channel assessment threshold for each of the one or more wireless communication devices may further comprise a clear channel assessment threshold update unit adapted to receive a parameter report indicative of at least one of the one or more parameters from the wireless communication device, and update the respective clear channel assessment threshold value of the threshold database based on the received parameter report.

The clear channel assessment threshold update unit may be further adapted to transmit a parameter request to the wireless communication device to trigger the parameter report according to some embodiments.

The arrangement may, in some embodiments, further comprise a clear channel assessment threshold configuration unit adapted to detect that a transmission to the wireless communication device is intended, load the maintained respective clear channel assessment threshold value from the threshold database, and cause sensing of the channel based on the maintained respective clear channel assessment threshold value.

In some embodiments, the arrangement may further comprise a channel sensing unit adapted to sense the channel based on the maintained respective clear channel assessment threshold value.

The channel sensing unit may, for example, be adapted to sense the channel based on the maintained respective clear channel assessment threshold value by comparing a received signal level to the maintained respective clear channel assessment threshold value, and determining the channel to be free for transmission to the wireless communication device if the received signal level does not exceed the maintained respective clear channel assessment threshold value.

A fourth aspect is a physical layer convergence protocol (PLCP) sublayer of a wireless local area network (WLAN) protocol stack comprising the arrangement according to the third aspect. The threshold database may or may not be comprised in the physical layer convergence protocol sublayer of the fourth aspect.

A fifth aspect is an access point comprising at least one of the arrangement according to the third aspect and the physical layer convergence protocol sublayer of the fourth aspect.

In some embodiments, the third, fourth and fifth aspects may additionally have features identical with or corresponding to any of the various features as explained above for the first aspect.

An advantage of some embodiments is that a more optimal way to configure the clear channel assessment threshold (CCAT) is provided.

A further advantage of some embodiments is that a less harsh tradeoff between interference avoidance and channel utilization is enabled.

Another advantage of some embodiments is that system efficiency is increased.

Yet an advantage of some embodiments is that throughput for a wireless communication device (and thus the user experience) is increased.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where a WLAN access point configures a clear channel assessment threshold (CCAT) for each wireless communication device associated to it. Contrarily, WLAN access points of the prior art apply a single CCAT for all wireless communication devices associated to it.

As elaborated on above, configuration of the CCAT at an access point is a tradeoff between interference avoidance and channel utilization. Using a single CCAT may cause sub-optimal performance of interference avoidance and/or channel utilization. It will be understood in the following that different CCAT values may be optimal (or beneficial) for different devices. Typically, an optimum CCAT value for a particular device may be dependent on the location of the device in relation to the access point and/or in relation to other devices. These parameters may also be manifested in terms of the radio condition experienced by the device.

Figure 1:
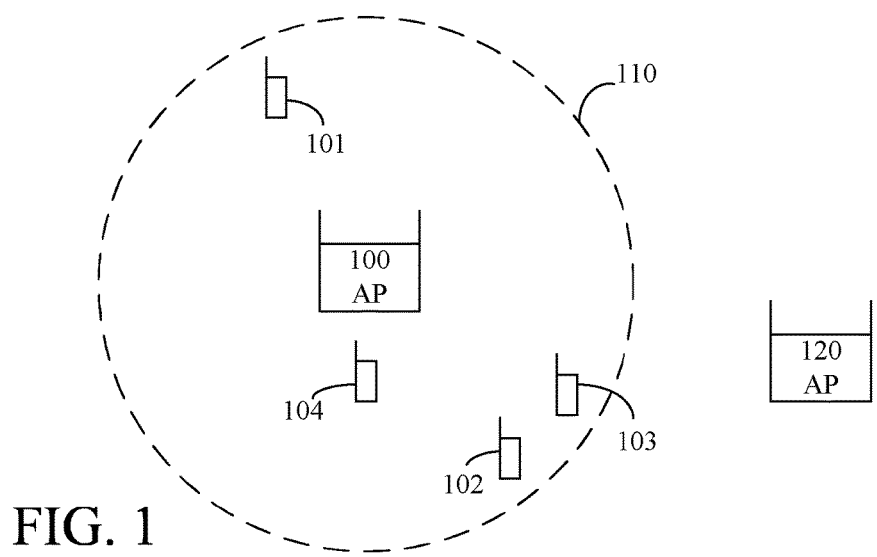
FIG. 1 is a schematic drawing illustrating an example WLAN scenario according to some embodiments.

For example, when the access point 100 of FIG. 1 intends to transmit data to the device 101, it first senses the channel based on the CCAT represented by the sensing area 110. If the device 103 is transmitting (e.g. to the access point (AP) 120) during the sensing operation, the channel will typically be determined to be busy (since the device 103 is within the sensing area 110). Thus, the intended transmission by the access point 100 to the device 101 is deferred or cancelled even though concurrent transmission might actually have been successful (since the distance from device 103 to device 101 is rather large, the signal-to-noise ratio—SIR—at the device 101 would probably have been high enough to receive the intended transmission from the access point 100). On the other hand, if the access point 100 intends to transmit data to the device 102 while the device 103 is transmitting the SIR at the device 102 would probably be too low to correctly receive the intended transmission from the access point 100 (since the distance from device 103 to device 102 is rather small).

Some embodiments relate to adjustment of the sensitivity threshold (CCAT) of an access point in a wireless local area network. More particularly, one sensitivity threshold value is configured for each wireless communication device associated with the access point. Furthermore, some embodiments relate to determination of an optimal (or at least beneficial) sensitivity threshold value. The sensitivity threshold value may be adjusted dynamically according to some embodiments. Dynamic adjustment may, for example, be based on device specific information (device parameters).

Figure 2:
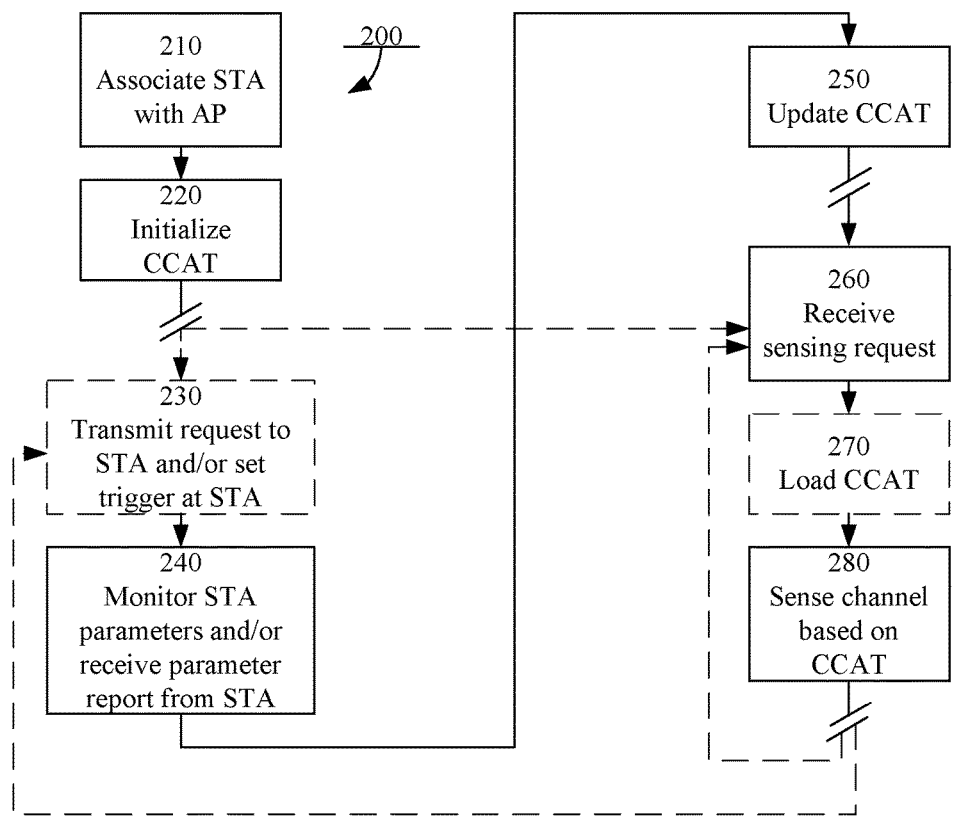
FIG. 2 is a flowchart illustrating example method steps according to some embodiments.

FIG. 2 illustrates an example method 200 according to some embodiments. The method 200 may, for example, be performed by an access point (e.g. the access point 100 of FIG. 1) adapted to operate in association with a communication standard (such as an IEEE 802.11x WLAN standard) using carrier sensing multiple access with collision avoidance (CSMA/CA) and adapted to communicate with one or more wireless communication devices associated with the access point.

The method 200 implements a possible way to maintain a respective CCAT value for each wireless communication device based on one or more parameters of the wireless communication device, wherein the CCAT value for each wireless communication device is for application in channel sensing related to an intended transmission to the wireless communication device.

Generally and as already mentioned above, the on one or more parameters of the wireless communication device may include any suitable parameters associated with the wireless communication device, e.g.

a geographical location of the wireless communication device and/or an interfering device, a received signal strength, power or similar measure (as experienced at the wireless communication device or at the access point), a target throughput to the wireless communication device, a quality (e.g. bit error rate, packet error rate, or similar) of a communication link between the access point and the wireless communication device, etc.

The method 200 starts in step 210 where a wireless communication device (here referred to by STA) is associated with the access point (AP). In connection with, or as part of, the association step the CCAT is initialized for the wireless communication device in step 220. The initialized CCAT may be used by the access point if/when the access point intends to transmit to the newly associated wireless communication device (260, 270, 280).

Step 220 may typically comprise initializing the CCAT to a default value (e.g. corresponding to a value used for the access point in any suitable prior art) which may, for example, be the same for all devices. Alternatively, the CCAT may be set to a value corresponding or similar to that of step 250 (which will be described later on) if the required parameters are available or can be estimated when step 220 is executed. The CCAT value is typically saved in a threshold database.

Once the wireless communication device is associated with the access point, the access point may, at any time, determine than there is data to transmit to the wireless communication device and perform a corresponding channel sensing procedure (steps 260, 270, 280). Also, once the wireless communication device is associated with the access point, the access point may, at any time, perform a procedure to configure or reconfigure the CCAT value for the wireless communication device (steps 230, 240, 250). In FIG. 2, these procedures are illustrating in a certain order. However, as illustrated by the dashed arrows, these processes may (alternatively or additionally) be performed in any other order.

To achieve improved user throughput and/or system efficiency, the CCAT is dynamically adjusted based on local conditions at each wireless communication device according to some embodiments.

The access point may transmit a parameter request to the wireless communication device as illustrated by optional step 230. The parameter request may trigger a corresponding parameter report indicative of at least one of the one or more parameters from the wireless communication device which is received in step 240.

Alternatively or additionally, the access point may set a suitable trigger condition in optional step 230 for the wireless communication device to transmit the parameter report. For example, the access point may configure the wireless communication device to send a parameter report at one or more of the following triggers:
 periodically, with some suitable interval,
 when the wireless communication device is non-stationary,
 when a moving speed of wireless communication device is above a speed threshold,
 when the radio condition of the wireless communication device changes,
 when the wireless communication device is about to request data to be transmitted from the access point,
 at some other suitable event.

Alternatively or additionally, the access point may autonomously monitor (e.g. continuously, periodically, or event-based) one or more of the parameters of the wireless communication device according to step 240.

In any case, the access point acquires the one or more parameters of the wireless communication device before execution of step 250, where the CCAT value is configured (or reconfigured/updated) based on the one or more parameters. The updated CCAT value may be accordingly stored in the threshold database. The updated CCAT may be used by the access point if/when the access point intends to transmit to the newly associated wireless communication device (260, 270, 280).

When the access point detects that is has data intended for transmission to the wireless communication device, a channel sensing request (typically including the identity of the device) may be received from higher layers as illustrated in step 260. In some embodiments, reception of this request may cause execution of steps 230-250 before proceeding to optional step 270.

If the CCAT value is kept in a threshold database, optional step 270 may comprise querying the threshold database to load the CCAT value for the wireless communication device.

In step 280, the channel is sensed based on the CCAT value of the wireless communication device. Hence, it is determined whether the channel is free or busy and the intended transmission is handled accordingly as elaborated on above.

A few examples of how the one or more parameters may be used to maintain a respective CCAT value for each wireless communication device will now be given. The examples may, for instance, be used to implement suitable parts of steps 230, 240, and/or 250.

The one or more parameters may comprise a strength of a signal transmitted from the access point as received by the wireless communication device. The received signal strength may, for example, be measured in terms of RSSI (received signal strength indicator), RSCP (received signal code power), or RCPI (received channel power indicator).

The CCAT value for a wireless device n ($CCAT_n$) may, for example, be set to $CCAT_n = \max(RSSI_n - \text{mar}; CCAT_{min})$, where $RSSI_n$ is the RSSI of device n, mar is a margin value, and $CCAT_{min}$ is a minimum allowed threshold value (i.e. a lower bound of CCAT). The RSCP of device n may, of course, be used instead of the RSSI of device n. The margin value may be designed to ensure that a certain level of SIR (or SINR, signal-to-interference-and-noise ratio) at the device n when receiving data transmissions from the access point.

Thus, the respective clear channel assessment threshold value may be determined as a maximum of a lowest possible threshold value and the received signal strength minus a margin value.

Figure 3:
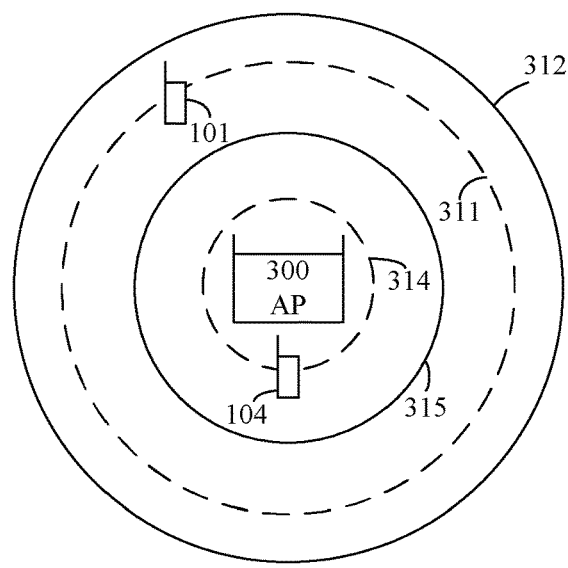
FIG. 3 is a schematic drawing illustrating example CCAT values according to some embodiments.

FIG. 3 illustrates a similar situation as that of FIG. 1, with an access point (AP) 300 having different associated devices of which two 101, 104 are shown.

The area 311 represent a sensing area that would result in setting the CCAT for device 101 to RSSI as measured at the device 101. Similarly, the area 314 represent a sensing area that would result in setting the CCAT for device 104 to RSSI as measured at the device 104. It should be noted that, since the device 104 is closer to the access point 300 than the device 101 is to the access point 300, the RSSI measured at device 104 is typically higher than the RSSI measured at the device 101 and, consequently, the sensing area 314 for the device 104 is smaller than the sensing area 311 for the device 101. This implementation uses the fact that the device 104 can probably tolerate a higher amount of interference than the device 101. This is because, assuming a same required SIR (or SINR), a higher RSSI entails a higher interference level.

The sensing area 312 corresponds to a CCAT value of RSSI−mar for the device 101 and the sensing area 315 corresponds to a CCAT value of RSSI−mar for the device 104.

Alternatively or additionally, the one or more parameters may comprise an indication of a geographical location of the wireless communication device.

For example, knowledge of the geographical location (e.g. the distance to the access point) of the respective device may enable a similar approach as the approach described above in connection with FIG. 3.

Alternatively or additionally, the one or more parameters may comprise an indication of a geographical location of an interferer (e.g. other wireless communication devices).

For example, a device which is close to an interferer may benefit from having a lower CCAT value than a device which is far from the interferer, even if the distance to the access point is the same for the two devices. This may be achieved, for instance, by setting the margin value based on whether or nor the wireless communication device has an interferer in its vicinity.

Hence, the margin value may be set to a first value if the interferer is indicated to be in a first geographical location and to a second value if the interferer is indicated to be in a second geographical location, wherein the first value is larger than the second value and the first geographical location is closer to the geographical location indication of the wireless communication device than the second geographical location is.

Thus, two or more different margin values may be configured for use in relation to different relative locations between the device for which CCAT should be configured and the interferer(s). For example, the following three margin values may be applied, where $MAR_1 > MAR_3 > MAR_2$:

$MAR_1$ if the interferer is in the same direction (e.g. within a same angular range) as the device for which CCAT should be configured.

$MAR_2$ if the interferer is in the opposite direction (e.g. within an angular range comprising the opposite direction) as the device for which CCAT should be configured.

$MAR_3$ otherwise.

Figure 4:
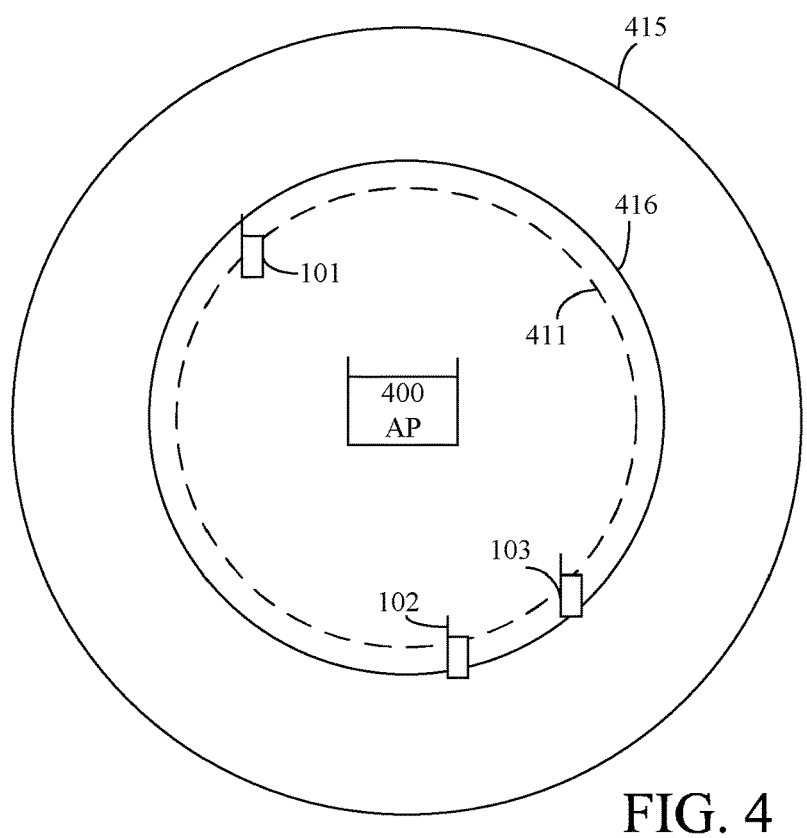
FIG. 4 is a schematic drawing illustrating example CCAT values according to some embodiments.

FIG. 4 illustrates a similar situation as that of FIG. 1, with an access point (AP) 400 having different associated devices of which three 101, 102, 103 are shown.

The area 411 represent a sensing area that would result in setting the CCAT for any of the devices 101, 102 to RSSI as measured at the respective device (same distance to access point). Since the device 102 experiences much more interference from the interfering device 103 than the device 101 does, it may be reasonable to set the CCAT to a lower value (higher margin value) for the device 102 than for the device 101. The sensing area 416 corresponds to a CCAT value of $RSSI-mar_{101}$ for the device 101 and the sensing area 415 corresponds to a CCAT value of $RSSI-mar_{102}$ for the device 102.

The approach exemplified in FIG. 4 may be thought of as using both the distances between devices and access point and the angles at which the access points sees the devices, which together may form a geographical location of the respective device.

Combinations of the approaches explained above in connection to FIGS. 3 and 4 (or similar approaches) may of course also be used.

Geographical location indications of devices (intended for transmission or interfering devices) may be achieved in accordance with any suitable known or future method. The geographical location indication of a device may be provided by the device itself, by another device aware of its presence, and/or may be determined by the access point. A few examples of positioning techniques that may be used (alone or in combination) to determine the geographical location indications comprise:

Combination of Angle of Arrival (AoA) and received signal strength (e.g. RSSI, RSCP, RCPI, etc.)

Report from the wireless communication devices (of own position and possibly interferer position)

Triangulation

GNSS—Global Navigation Satellite System (e.g. GPS—Global Positioning System)

As implied above, a report from a wireless communication device (e.g. indication the geographical position of the devices and/or interferers) could be requested by the access point, could be configured as an event-triggered report, and/or could be configured as a periodical report.

One option for implementing such reports is to extend the current Wireless LAN Radio Measurements (see e.g. IEEE 802.11-2012).

This could, for example, be achieved by introducing a new measurement type, which may bear the information about the location of the device (STA) as well as the location of other devices (STA) in its vicinity, and adding it to the list of the currently existing measurements which are illustrated by the following table:

| Name | Measurement Type | Measurement Use |
| --- | --- | --- |
| Basic request | 0 | Spectrum Management |
| Clear channel assessment (CCA) request | 1 | |
| Receive power indication (RPI) histogram request | 2 | |
| Channel load request | 3 | Radio Measurement |
| Noise histogram request | 4 | |
| Beacon request | 5 | |
| Frame request | 6 | |
| STA statistics request | 7 | Radio Measurement and WNM |
| LCI request | 8 | Radio Measurement and WNM |
| Transmit stream/category measurement request | 9 | Radio Measurement |
| Multicast diagnostics request | 10 | WNM |
| Location Civic request | 11 | Radio Measurement and WNM |
| Location Identifier request | 12 | Radio Measurement and WNM |
| Reserved | 13-254 | N/A |
| Measurement pause request | 255 | Radio Measurement |

Alternatively or additionally, it may be considered to augment the currently existing location measurement to make it contain not only the information about the location of the device (STA), but also information about the location of other devices (STA) in its vicinity.

In order to perform triangulation for determining the location of the devices in a network, information is typically needed from more than one (preferably at least three) access points that can observe a certain device. This may be achieved, for example, by the access points being interconnected and exchanging information about devices they observe, and/or by there being a dedicated function in the network that collects information regarding devices and reports to the access points. In the latter case, the triangulation may be performed by the access point or by the unit implementing the dedicated function.

In another example (which may be used alone or in combination with any of the examples already described), dynamic adjustment of the CCAT may be achieved by employing a performance target.

For example, the one or more parameters comprise a target throughput to the wireless communication device. The throughput to a device may, for example, be measured in terms of throughput per transmission opportunity, e.g. in form of a modulation and coding scheme (MCS).

As has been seen above, the less interference a device tolerates, the lower the CCAT value should be for the device. Hence, according to some embodiments, a target value of a suitable performance measure (e.g. MCS) may be set and the CCAT value may be dynamically adjusted accordingly to achieve the target.

Then, the respective clear channel assessment threshold value may be increased if a measured throughput is higher than the target throughput and the respective clear channel assessment threshold value may be decreased if the measured throughput is lower than the target throughput. In some embodiments, a hysteresis may be added below and/or above the target throughput.

Figure 5:
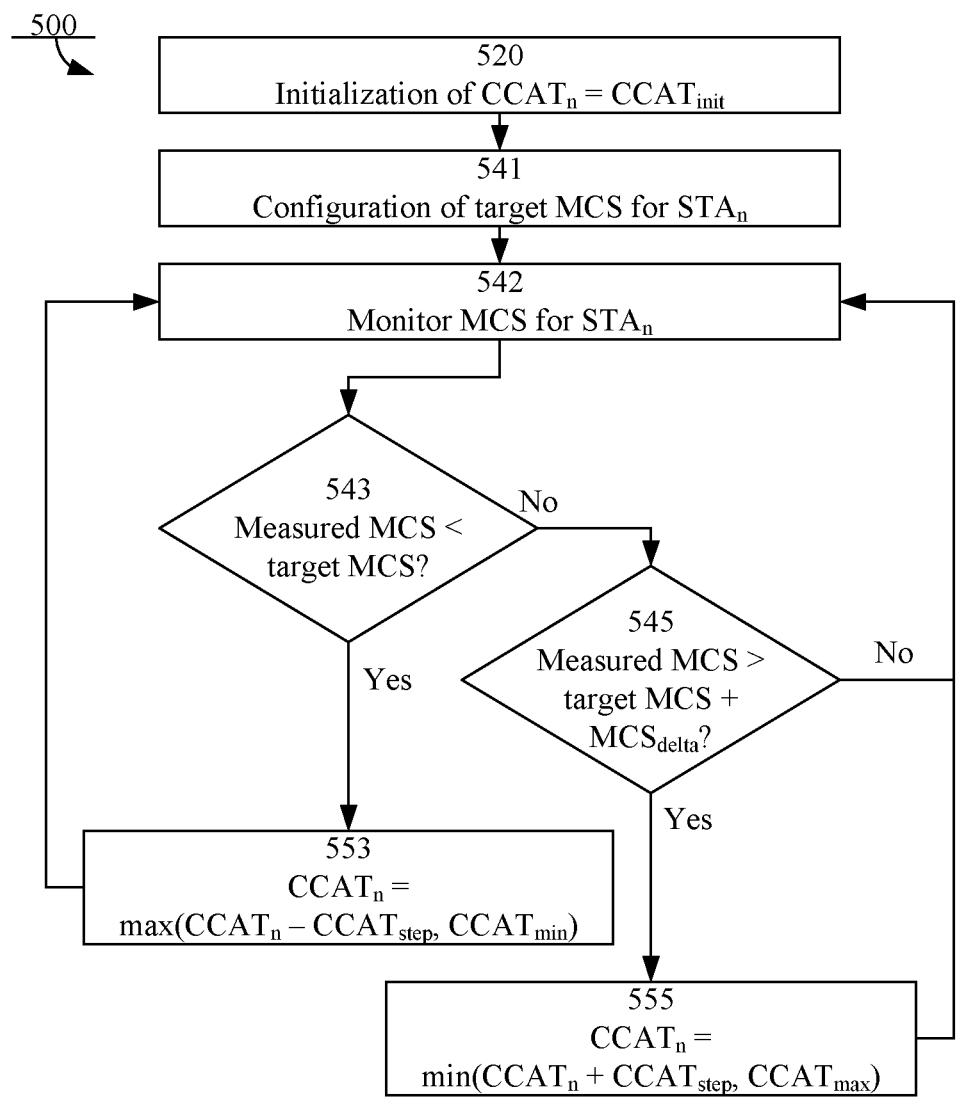
FIG. 5 is a flowchart illustrating example method steps according to some embodiments.

FIG. 5 illustrate an example method 500 according to this principle applied to a wireless communication device n ($STA_n$). The method 500 may, for example, be performed as part of steps 210, 240, 250 of FIG. 2.

After initialization of $CCAT_n$ to an initial value $CCAT_{init}$ in step 520 (compare with step 220 of FIG. 2), a target MCS is configured for $STA_n$ in step 541. The target MCS may, for example, be chosen such that it can be achieved without any (or with very little) interference.

Then, in step 542, the experienced MCS for $STA_n$ is monitored (measured). If the measured MCS is below the target MCS (Yes-path out from step 543), then $CCAT_n$ is decreased in step 553 (e.g. by $CCAT_{step}$ until a minimum allowable value $CCAT_{min}$ is reached) to enlarge the sensing area. If the measured MCS is above (or equal to) the target MCS (No-path out from step 543) but below (or equal to) the target MCS plus an offset $MCS_{delta}$ (No-path out from step 545) no adjustment of $CCAT_n$ is made. If the measured MCS is above the target MCS plus the offset $MCS_{delta}$ (Yes-path out from step 545)), then $CCAT_n$ is increased in step 555 (e.g. by $CCAT_{step}$ until a maximum allowable value $CCAT_{max}$ is reached) to reduce the sensing area.

Steps 542, 543, 553, 545, 555 may be repeated (periodically or otherwise) to track changes in the network conditions.

Figure 6:
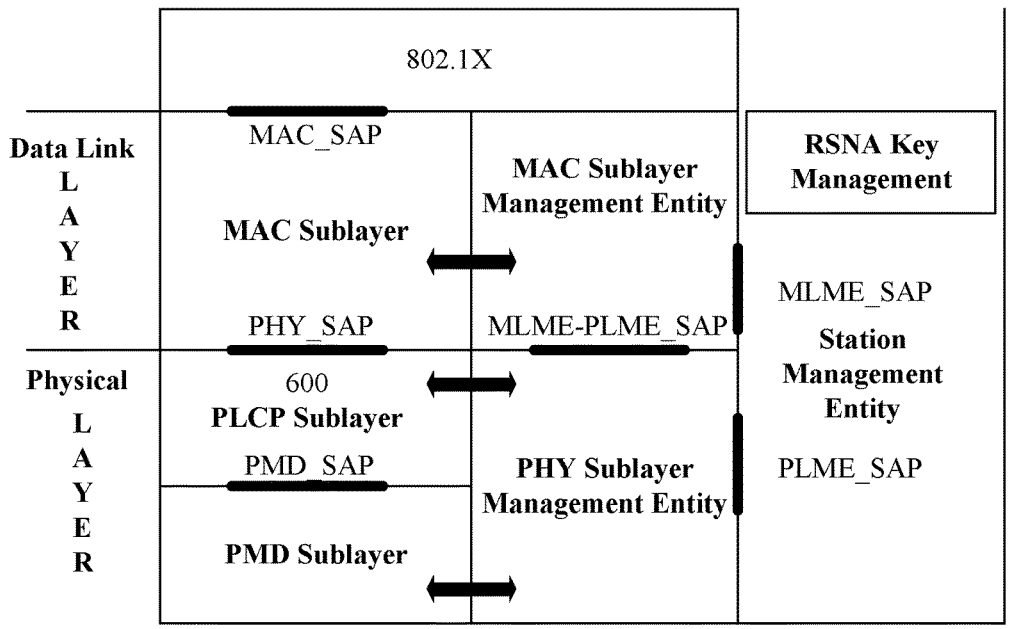
FIG. 6 is a schematic drawing illustrating an example WLAN stack according to some embodiments.

FIG. 6 illustrates an example of a WLAN protocol stack according to the IEEE layer specifications, including PMD (physical medium dependent), PLCP (physical layer convergence protocol), MAC/LLC (medium access control/ logical link control). The PLCP sublayer 600 typically performs CCA and reports the result to the MAC layer. Hence, the CCAT configuration is comprised in the PLCP sublayer according to some embodiments.

Figure 7:
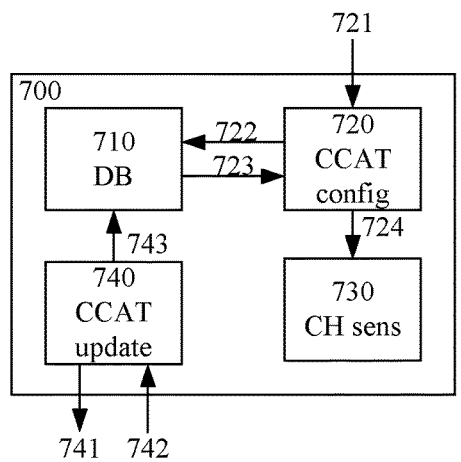
FIG. 7 is a block diagram illustrating an example arrangement according to some embodiments.

FIG. 7 illustrate an example arrangement 700 for an access point adapted to operate in association with a communication standard using CSMA/CA and adapted to communicate with one or more wireless communication devices associated with the access point according to some embodiments.

The arrangement 700 (possibly excluding the threshold database 710) may, for example, be comprised in the PLCP sublayer 600 of FIG. 6 and/or in a access point of a WLAN system. The arrangement 700 may, for example, be adapted to perform any of the method steps described in connection with FIG. 2 and/or FIG. 5.

The arrangement comprises means for maintaining a respective CCAT value for each of the one or more wireless communication devices based on one or more parameters of the wireless communication device, wherein the clear channel assessment threshold value is for application in channel sensing related to an intended transmission to the wireless communication device.

The example arrangement 700 comprises a threshold database (DB) 710 adapted to store the respective CCAT values.

A clear channel assessment threshold update unit (CCAT update) 740 may be adapted to transmit a parameter request to a device as illustrated by 741, and/or otherwise trigger a parameter report as elaborated on above (compare with step 230 of FIG. 2).

The CCAT update unit 740 is adapted to receive a parameter report indicative of at least one of the one or more parameters from the device as illustrated by 742, and/or otherwise monitor the one or more parameters of the device as elaborated on above (compare with step 240 of FIG. 2).

The CCAT update unit 740 is also adapted to update the respective CCAT value of the threshold database 710 based on the received parameter report and/or the monitoring as illustrated by 743 (compare with step 250 of FIG. 2).

The example arrangement 700 further comprises a clear channel assessment threshold configuration unit (CCAT config) 720 adapted to detect that a transmission to the wireless communication device is intended as illustrated by 721 (compare with step 260 of FIG. 2), load the CCAT value from the threshold database (e.g. by querying the database) as illustrated by 722, 723 (compare with step 270 of FIG. 2), and cause sensing of the channel based on the CCAT value.

The CCAT configuration unit 720 typically instructs a channel sensing unit (CH sens) 730 of the example arrangement to sensing of the channel based on the CCAT value as illustrated by 724, and the channel sensing unit 730 is adapted to sense the channel based on the CCAT value (compare with step 280 of FIG. 2).

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as an access point) comprising circuitry/logic or performing methods according to any of the embodiments.

Figure 8:
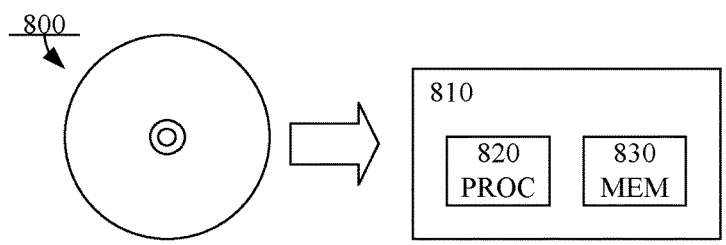
FIG. 8 is a schematic drawing illustrating an example computer readable medium according to some embodiments.

According to some embodiments, a computer program product comprises a computer readable medium such as, for example, a diskette, an USB stick, or a CD-ROM as illustrated by the CD-ROM 800 of FIG. 8. The computer readable medium may have stored thereon a computer program comprising program instructions. The computer program may be loadable into a data-processing unit (PROC) 820, which may, for example, be comprised in an access point 810. When loaded into the data-processing unit 820, the computer program may be stored in a memory (MEM) 830 associated with or integral to the data-processing unit 820. In some embodiments, the computer readable medium may comprise an on-chip memory (e.g. a flash memory). According to some embodiments, the computer program may, when loaded into and run by the data-processing unit, cause the data-processing unit to execute method steps according to, for example, the methods shown in any of the FIGS. 2 and 5.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of an access point adapted to operate in association with a communication standard with application of a sense-before-transmit principle and adapted to communicate via a wireless channel with at least a first wireless communication device (WCD) associated with the access point and a second WCD associated with the access point, the method comprising:
   maintaining a first clear channel assessment threshold (CCAT) value for the first WCD based on one or more parameters of the first WCD;
   maintaining a second CCAT value for the second WCD based on one or more parameters of the second WCD, wherein the first and second CCAT values are separate values;
   obtaining data intended for the first WCD; and
   after obtaining the data intended for the first WCD, determining, based on the first CCAT value maintained for the first WCD, whether the wireless channel is free for a downlink transmission from the access point to the first WCD; and
   as a result of determining, based on the first CCAT value maintained for the first WCD, that the wireless channel is free for a downlink transmission from the access point to the first WCD, transmitting to the first WCD the data intended for the first WCD, wherein
   the step of determining, based on the first CCAT value maintained for the first WCD, whether the wireless channel is free for a downlink transmission from the access point to the first WCD comprises:
   comparing a received signal level to the first CCAT value; and
   determining the channel to be free for transmission to the first WCD as a result of determining that the received signal level does not exceed the first CCAT value maintained for the first WCD.

2. The method of claim 1,
   further comprising:
   obtaining a CCAT threshold value;
   calculating a signal strength value by subtracting a margin value from a received signal strength;
   determining whether the signal strength value is greater than the CCAT threshold value; and
   setting the first CCAT value equal to the greater of: i) the CCAT threshold value and ii) the calculated signal strength value.

3. The method of claim 2, further comprising:
   setting the margin value to one of a first value and a second value based on an indicated location of an interferer, wherein the first value is larger than the second value.

4. The method of claim 1, further comprising increasing the first CCAT value as a result of determining that a measured throughput is higher than a target throughput.

5. The method of claim 1, further comprising initializing the first CCAT value to a default value when the first WCD is associated with the access point.

6. The method of claim 1, further comprising:
   receiving a parameter report indicative of at least one of the one or more parameters from the first WCD; and
   updating the first CCAT value based on the received parameter report.

7. The method of claim 6, further comprising transmitting a parameter request to the first WCD to trigger the parameter report.

8. The method of claim 1, wherein
   maintaining the first CCAT value comprises storing the a record in a threshold database wherein the record comprises the first CCAT value and a first WCD identifier for identifying the first WCD, thereby associating the first CCAT value with the first WCD identifier, and
   the step of determining, based on the first CCAT value maintained for the first WCD, whether the wireless channel is free for a downlink transmission from the access point to the first WCD further comprises, prior to performing the comparing, querying the threshold database using the first WCD identifier to obtain the first CCAT value associated with the first WCD identifier.

9. The method of claim 1, further comprising:
   determining the first CCAT value based on a geographic location of the first WCD and a geographic location of a third WCD that is transmitting data.

10. The method of claim 1, further comprising:
    obtaining data intended for the second WCD; and
    after obtaining the data intended for the second WCD, determining, based on the second CCAT value maintained for the second WCD, whether the wireless channel is free for a downlink transmission from the access point to the second WCD; and
    as a result of determining, based on the second CCAT value maintained for the second WCD, that the wireless channel is free for a downlink transmission from the access point to the second WCD, transmitting to the second WCD the data intended for the second WCD, wherein
    the step of determining, based on the second CCAT value maintained for the second WCD, whether the wireless channel is free for a downlink transmission from the access point to the second WCD comprises:
    comparing a received signal level to the second CCAT value; and
    determining the channel to be free for transmission to the second WCD as a result of determining that the received signal level does not exceed the second CCAT value maintained for the second WCD.

11. A computer program product comprising a non-transitory computer readable medium comprising a computer program comprising program instructions, the computer program being loadable into a data-processing unit and adapted to cause execution of the method of claim 1 when the computer program is run by the data-processing unit.

12. An apparatus adapted to use a sense-before-transmit procedure and adapted to communicate with a wireless communication device (WCD) associated with an access point, the apparatus being adapted to:
- maintain a first clear channel assessment threshold (CCAT) value for the first WCD based on one or more parameters of the first WCD;
- maintain a second CCAT value for the second WCD based on one or more parameters of the second WCD, wherein the first and second CCAT values are separate values;
- obtain data intended for the first WCD; and
- after obtaining the data intended for the first WCD, determine, based on the first CCAT value maintained for the first WCD, whether the wireless channel is free for a downlink transmission from the access point to the first WCD; and
- as a result of determining, based on the first CCAT value maintained for the first WCD, that the wireless channel is free for a downlink transmission from the access point to the first WCD, transmit to the first WCD the data intended for the first WCD, wherein
- the apparatus is configured to determine, based on the first CCAT value maintained for the first WCD, whether the wireless channel is free for a downlink transmission from the access point to the first WCD by performing a clear channel assessment process comprising:
- comparing a received signal level to the first CCAT value; and
- determining the channel to be free for transmission to the first WCD as a result of determining that the received signal level does not exceed the first CCAT value maintained for the first WCD.

13. The apparatus of claim 12, wherein the apparatus comprises a threshold database adapted to store the first CCAT value in association with a first WCD identifier for identifying the first WCD.

14. The apparatus of claim 13, wherein the apparatus is further adapted to:
- receive a parameter report indicative of at least one of the one or more parameters from the first WCD; and
- update the first CCAT value of the threshold database based on the received parameter report.

15. The apparatus of claim 14, wherein the apparatus is further adapted to transmit a parameter request to the first WCD to trigger the parameter report.

16. The apparatus of claim 13, wherein
the clear channel assessment process further comprises, prior to performing the comparing, querying the threshold database using the first WCD identifier to obtain the first CCAT value associated with the first WCD identifier.

17. The apparatus of claim 16, comprising a channel sensing unit adapted to sense the channel based on the first CCAT value.

18. The apparatus of claim 12, wherein the apparatus is further adapted to:
- obtain data intended for the second WCD; and
- after obtaining the data intended for the second WCD, determine, based on the second CCAT value maintained for the second WCD, whether the wireless channel is free for a downlink transmission from the access point to the second WCD; and
- as a result of determining, based on the second CCAT value maintained for the second WCD, that the wireless channel is free for a downlink transmission from the access point to the second WCD, transmitting to the second WCD the data intended for the second WCD, wherein
- the apparatus is configured to determine, based on the second CCAT value maintained for the second WCD, whether the wireless channel is free for a downlink transmission from the access point to the second WCD by performing a second clear channel assessment process comprising:
- comparing a received signal level to the second CCAT value; and
- determining the channel to be free for transmission to the second WCD as a result of determining that the received signal level does not exceed the second CCAT value maintained for the second WCD.

19. The apparatus of claim 12 further comprising a physical layer convergence protocol sublayer of a wireless local area network protocol stack.

20. An access point comprising the apparatus of claim 12.

* * * * *